(12) United States Patent
Liu et al.

(10) Patent No.: US 7,955,008 B1
(45) Date of Patent: Jun. 7, 2011

(54) MAGNET ARRAY MEMBER WITH MORE THAN FOUR POLES AND SHUTTER

(75) Inventors: Kao-Chi Liu, Taipei (TW); Yi-Hao Fan, Nanzhuang Township (TW); Chao-Jung Chiang, Hsinchu (TW); Kun-Feng Chiang, Taipei (TW)

(73) Assignees: Vi-Tai Technology Co., Ltd., Chung-Ho (TW); Kao-Chi Liu, Taipei (TW)

( * ) Notice: Subject to any disclaimer, the term of this patent is extended or adjusted under 35 U.S.C. 154(b) by 0 days.

(21) Appl. No.: 12/617,990

(22) Filed: Nov. 13, 2009

(51) Int. Cl.
*G03B 9/08* (2006.01)
*G03B 9/10* (2006.01)

(52) U.S. Cl. .................................... 396/463; 396/493

(58) Field of Classification Search .................. 396/463, 396/464, 469, 493, 508, 510
See application file for complete search history.

(56) References Cited

U.S. PATENT DOCUMENTS

| 7,242,123 | B2* | 7/2007 | Miyawaki | 310/156.32 |
| 2003/0062788 | A1* | 4/2003 | Aoshima | 310/156.32 |
| 2005/0146233 | A1* | 7/2005 | Miyawaki | 310/49 R |
| 2007/0018513 | A1* | 1/2007 | Yamamoto et al. | 310/49 R |
| 2007/0172231 | A1* | 7/2007 | Durfee | 396/463 |
| 2008/0240707 | A1* | 10/2008 | Yasuda et al. | 396/463 |
| 2010/0202770 | A1* | 8/2010 | Kihara et al. | 396/493 |

* cited by examiner

*Primary Examiner* — Rodney E Fuller
(74) *Attorney, Agent, or Firm* — C. G. Mersereau; Nikolai & Mersereau, P.A.

(57) ABSTRACT

A magnet array member with more than four poles is used for being mounted on a shutter of a camera module of a portable mobile communication device, adjacent to one side of a yoke iron of the shutter. The magnet array member includes a disc portion and a driving portion. The disc portion has more than four N poles and S poles, and an annular side face and opposite first end face and second end face. The driving portion protrudes from one of the first end face and the second end face of the disc portion in a vertical direction. Since the driving portion protrudes from one end face of the disc portion, the disc portion can form more than four N poles and S poles when magnetized, thereby being convenient for mass production.

2 Claims, 5 Drawing Sheets

MAGNET ARRAY MEMBER WITH MORE THAN FOUR POLES AND SHUTTER

BACKGROUND OF THE INVENTION

1. Field of the Invention

The present invention is an apparatus which relates to a magnet, and more particularly to a magnet array member with more than four N poles and S poles and shutter with the magnet array member.

2. Description of Related Art

With the development of handheld communication electronic products, most handheld communication electronic products have camera lenses which have shutters disposed thereon for controlling exposure time. A shutter mainly includes a base, electromagnetic valves disposed on the base and blades combined with the electromagnetic valves. Based on movement of the blades, an aperture can be opened and closed thereby controlling the time when light enters the aperture. Each electromagnetic valve usually consists of a magnet, a yoke iron and a coil wound around the yoke iron. The coil is electrified and then acts on an N pole and an S pole of the magnet to drive the blade to move as desired.

However, for the demand of operation control for shutters, besides the function of controlling shutter time, blades need have the function of aperture control, so it is complicated to control the operation of blades. Generally, a magnet can be magnetized to form more than four sectors, that is, the arrangement of an N pole, an S pole, an N pole, an S pole, and under the effect of electrified yoke iron and coil, the magnet can have various changes of clockwise and anticlockwise rotation, so that the blades can be controlled to have multi-section changes, thereby achieving the demands of controlling shutters and apertures.

As shown in FIG. 1, a conventional magnet 11 mainly has an upper disc portion 111 and a lower disc portion 112, an arm portion 113 horizontally extending from a side edge of the upper disc portion 111, and a driving portion 114 perpendicularly protruding from the terminal of the arm portion 113. The driving portion 114 extends into blades so that the blades can be driven to swerve when the magnet 11 rotates.

Conventional magnets 11 mostly are made of metals with strong magnetism (such as iron, cobalt, nickel and so on), and then magnetized to form poles. However, the magnets with this structure can only form two poles, as shown in FIG. 2. It is because the protruding arm portion 113 interferes with a magnetizing equipment 12 during magnetization so that the magnet 11 cannot be magnetized to form four sectors. Accordingly, conventional magnets are not able to be applied in shutters for which operation control is complicated.

Therefore, the inventors of the present invention believe that the shortcomings described above are able to be resolved and, as a result, urge use of the present invention which is of a reasonable design and is an effective improvement based on deep research and thought.

SUMMARY OF THE INVENTION

A main object of the present invention is to provide a magnet array member which can be easily magnetized to form more than four poles and be convenient for mass production.

A secondary object of the present invention is to provide a shutter which has the above-mentioned magnet array member for complicated operation control. The shutter is usefully applied in a camera module of a portable mobile communication device.

To achieve the above-mentioned main object, a magnet array member having more than four poles in accordance with the present invention is provided. The magnet array member with more than four poles includes a disc portion and a driving portion. The disc portion has more than four N poles and S poles and an annular side face, a first end face and a second end face oppositely connected with the annular side face and a shaft hole extending through the first end face and the second end face. The driving portion protrudes from one or the other of the first end face and the second end face of the disc portion in a vertical direction.

To achieve the above-mentioned secondary object, a shutter of a camera module useful in a portable mobile communication device in accordance with the present invention is provided. The shutter includes a base, two electromagnetic valves, a first blade, a spacer and two second blades. The base has an aperture and two pivot columns. Each electromagnetic valve has a yoke iron disposed on a side edge of the base, a coil wound around the yoke iron, and a rotatable magnet array member adjacent to a side of the yoke iron. Each magnet array member has the above-mentioned disc portion and driving portion, and the pivot columns of the base pivotably extend through the shaft holes of the magnet array members. The first blade is disposed on the base, and the driving portion of one magnet array member of the two electromagnetic valves extends into one end of the first blade to drive the first blade to close or open the aperture of the base. The spacer is disposed on the base, the second blades are disposed over the spacer, and the driving portion of the other magnet array member of the two electromagnetic valves extends into one end of each second blade to drive the two second blades to close or open the aperture.

The efficacy of the present invention is as follows: since the driving portion doesn't protrude from a side edge of the disc portion but protrudes from one end face of the disc portion, the driving portion doesn't interfere with any magnetizing equipment when magnetized. Accordingly, the disc portion can form more than four N poles and S poles depending on design demands, which is convenient for mass production, and the magnet array member of the present invention can be applied in shutters, for which operation control is more complicated, to achieve the needed functions.

To further understand features and technical contents of the present invention, please refer to the following detailed description and drawings relating to the present invention. However, the drawings are only to be used as references and explanations, not to limit the present invention.

DETAILED DESCRIPTION OF THE PREFERRED EMBODIMENTS

Figure 1:
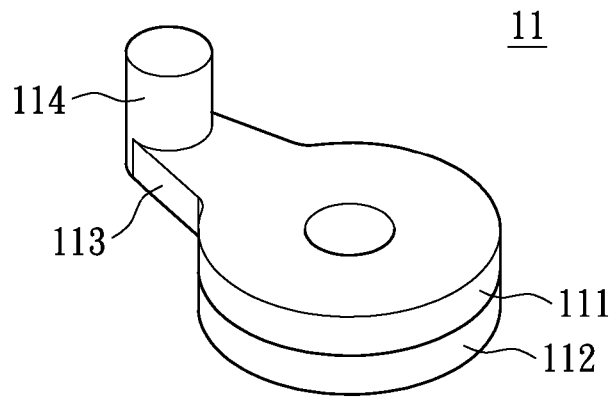
FIG. 1 is a perspective view of a conventional magnet.
Figure 2:
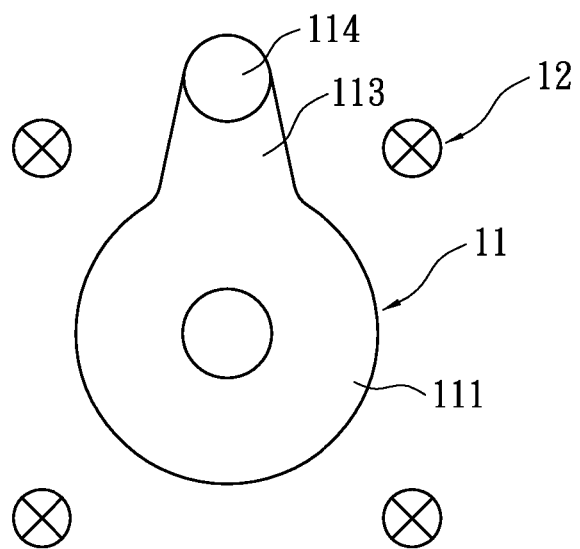
FIG. 2 is a schematic view of the conventional magnet magnetized by some magnetizing equipment.
Figure 3:
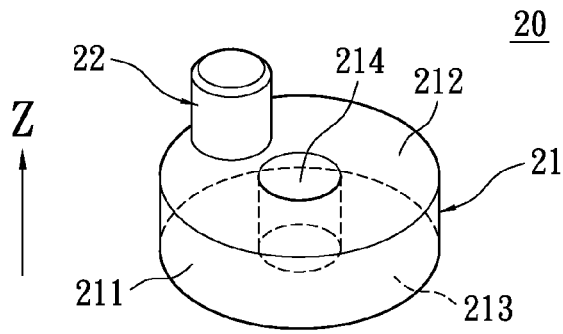
FIG. 3 is a perspective view of a magnet array member of the present invention.

Please refer to FIG. 3 illustrating a magnet array member 20 with more than four poles according to the present invention, which includes a disc portion 21 and a driving portion 22.

The disc portion 21 has an annular side face 211, a first end face 212 and a second end face 213 oppositely connected with the annular side face 211, and a shaft hole 214 extending through the first and the second end faces 212, 213. The driving portion 22 protrudes from one of the first end face 212 and the second end face 213 of the disc portion 21 in the vertical direction Z.

Figure 4:
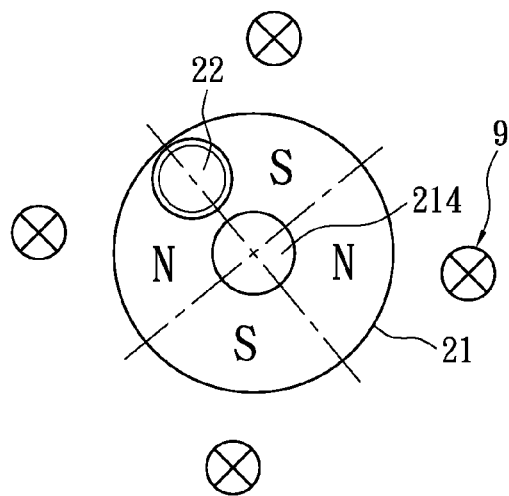
FIG. 4 is a schematic view of the magnet array member of the present invention magnetized by magnetizing equipment, with four poles.
Figure 5:
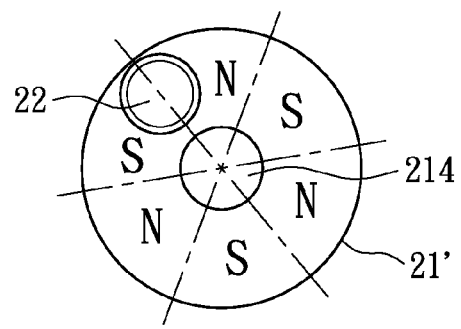
FIG. 5 is a schematic view of the magnet array member of the present invention, with six poles.

Please refer to FIG. 4, when the magnet array member 20 needs to be magnetized, since the driving portion 22 doesn't protrude from a side edge of the disc portion 21 but protrudes from one end face of the disc portion 21, the driving portion 22 doesn't interfere with magnetizing equipment 9. Accordingly, the disc portion 21 can form more than four, though totaling to even-numbered N poles and S poles depending on design demands. As shown in FIG. 4, the disc portion 21 has four N poles and S poles; or alternatively, as shown in FIG. 5, the disc portion 21' has six N poles and S poles. The N poles and the S poles of the disc portion 21 are alternately and generally annularly arranged on the disc portion 21.

Figure 6:
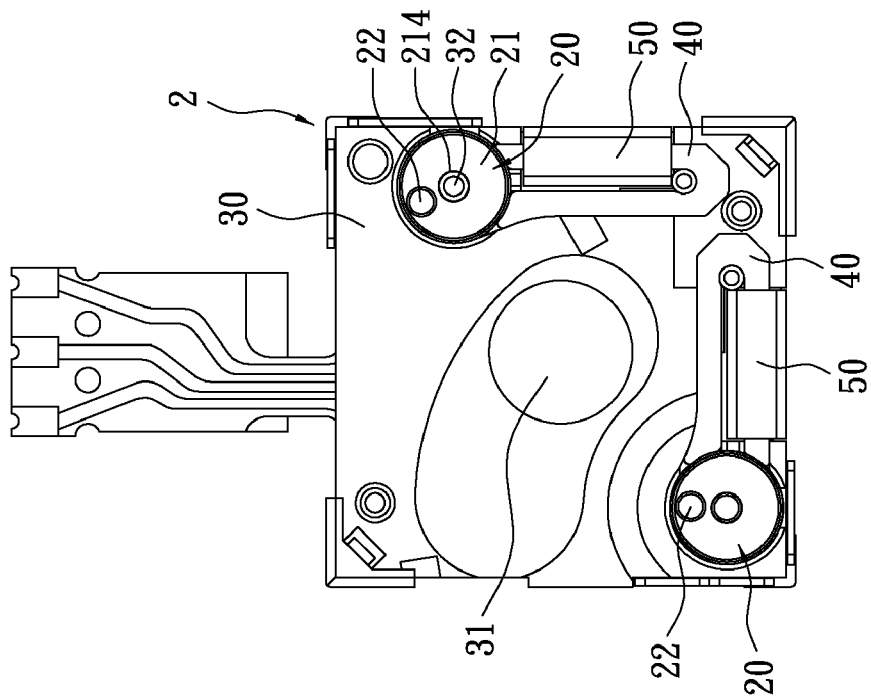
FIG. 6 is a first assembled planar view of a shutter of the present invention.

Please refer to FIG. 6, the magnet array member 20 of the present invention is provided for a shutter 2 of a camera module of a portable mobile communication device. The portable mobile communication device may be a mobile phone or a PDA, or other photographic or photometric device, etc. The shutter 2 includes a base 30, two yoke irons 40 disposed on side edges of the base 30, and coils 50 respectively wound around the yoke irons 40. The base 30 has an aperture 31 formed in the center thereof and two pivot columns 32 for respectively pivotably extending through the shaft hole 214 of two magnet array members 20 so that the two magnet array members 20 are rotatably disposed on the base 30 and each is adjacent to one side of the corresponding yoke iron 40, so as to form two electromagnetic valves with the yoke irons 40 and the coils 5.

Figure 7:
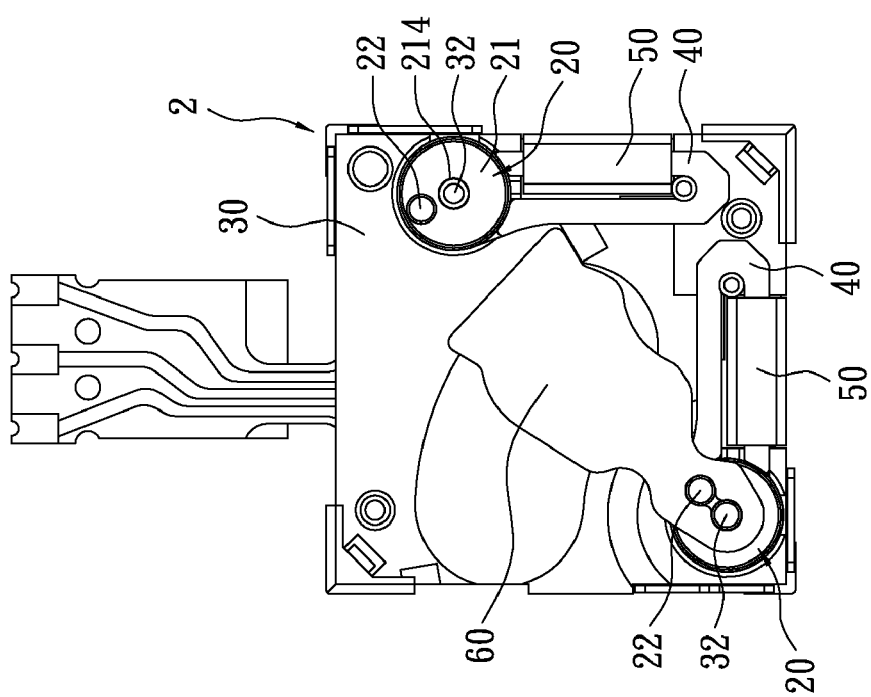
FIG. 7 is a second assembled planar view of the shutter of the present invention, showing that a first blade is in a closing state.
Figure 8:
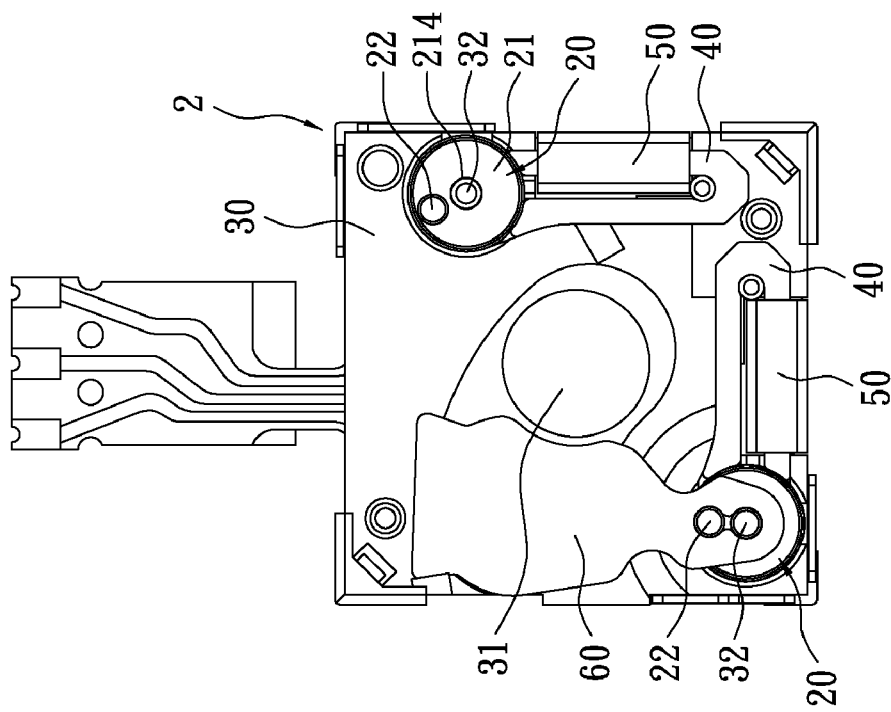
FIG. 8 is a third assembled planar view of the shutter of the present invention, showing that the first blade is in an opening state.

As shown in FIG. 7, a first blade 60 may be disposed on the base 30, and the driving portion 22 of one magnet array member 20 extends into one end of the first blade 60 to drive the first blade 60 to move, as shown in FIG. 7 and FIG. 8, thereby opening or closing the aperture 31.

Figure 9:
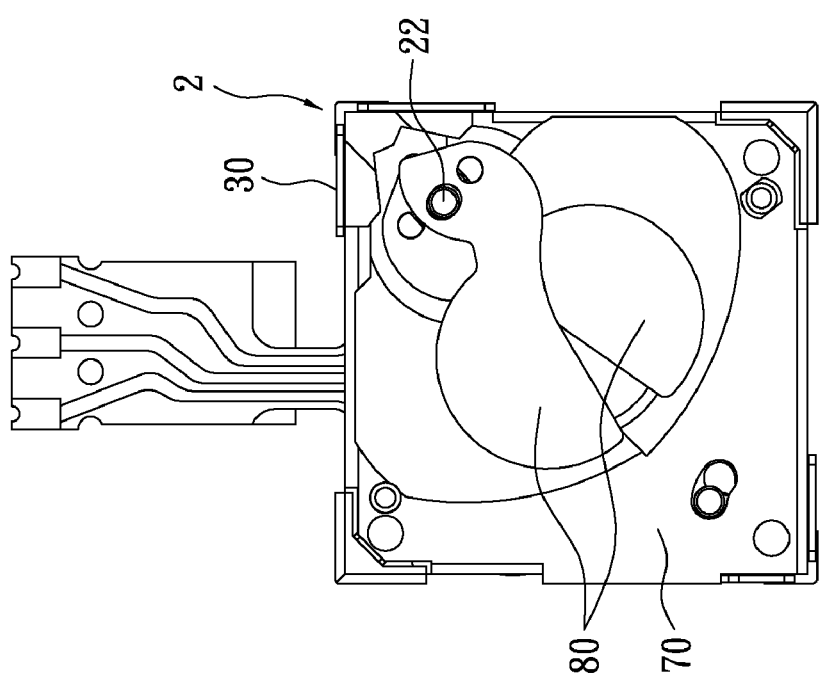
FIG. 9 is a fourth assembled planar view of the shutter of the present invention, showing that second blades are in a closing state.
Figure 10:
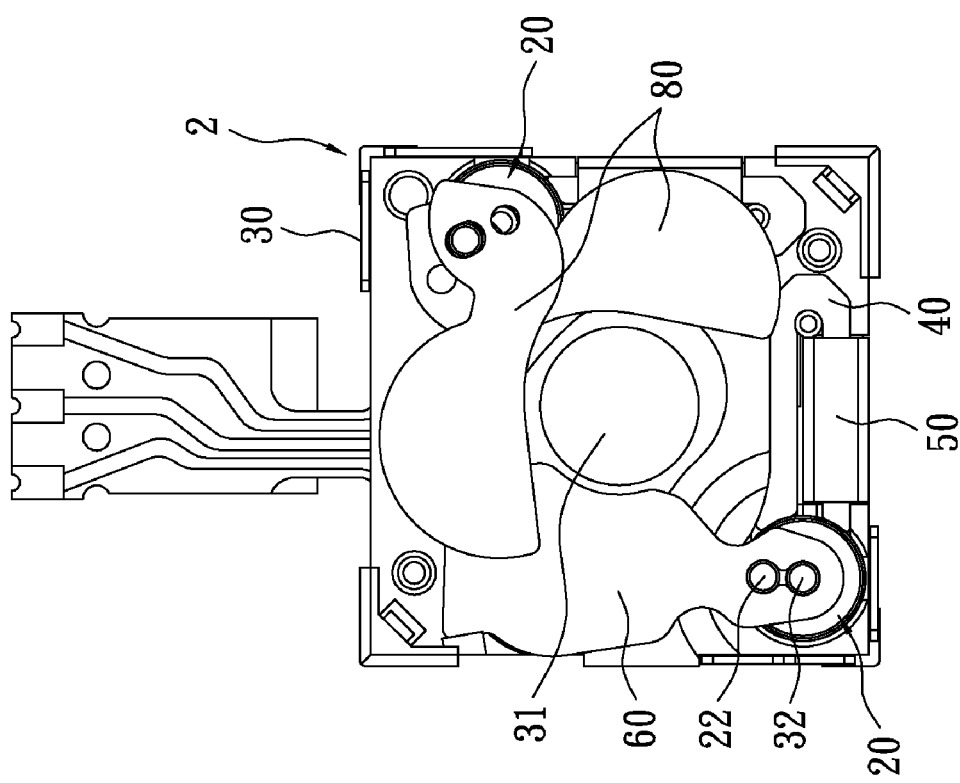
FIG. 10 is a fifth assembled planar view of the shutter of the present invention, showing that the second blades are in an opening state, wherein a spacer is removed for showing the second blades clearly.

As shown in FIG. 9, further, a spacer 70 may be disposed on the base 30 and located over the blade 60, and two second blade 80 are disposed over the spacer 70. The driving portion 22 of the other magnet array member 20 extends into one end of each second blade 80 to drive the two second blade 80 to move, as shown in FIG. 9 and FIG. 10, thereby opening or closing the aperture 31. Additionally, the two pivot columns 32 of the base 30 respective pivotably extend through one end of the first blade 60 and one end of each second blade 80 to be the rotation center of the blades. The first blade 60 may be a shutter blade and the second blades 80 may be aperture blades. Based on the collocation and interaction of the N poles and the S poles after the poles of the magnet array members 20 and the coils 50 are electrified, the magnet array members 20 can rotate in multi-section to control the travel range of the blades, thereby controlling the aperture size and the shutter time.

Accordingly, basing on the structure design of the magnet array member of the present invention, the present invention can ensure that the magnet forms more than four poles successfully when magnetized, which is convenient for mass production, and the magnet array member of the present invention can be applied in shutters, for which operation control is more complicated, to achieve the needed functions.

What are disclosed above are only the specification and the drawings of the preferred embodiment of the present invention and it is therefore not intended that the present invention be limited to the particular embodiment or embodiments disclosed. It will be understood by those skilled in the art that various equivalent changes or variations may be made depending on the specification and the drawings of the present invention without departing from the scope of the present invention which is defined solely and completely only within the following claims.

What is claimed is:

1. A shutter mechanism of a camera module, comprising:
   a base, having an aperture formed thereon and two pivot columns;
   two electromagnetic valves, each electromagnetic valve comprising a magnetic array member, a yoke iron, and a coil,
   the magnet array member including a disc-shape body having a pivoting slot defined at the rotational axis thereof and a driving member protruding from the disc surface of the disc-shape body,
      wherein the disc-shape body includes more than four radially defined interlaying magnetic pole regions,
      wherein the magnetic array member is rotatably disposed on the pivot columns of the base,
   the yoke iron being disposed on the base alongside of the magnet array member and abreast of the peripheral of the base,
   the coil being windingly disposed on the yoke iron;
   a first blade, pivotably disposed on the base and having a recessed structure,
   wherein the driving member of one of the magnet array member engages the recessed structure of the first blade for driving the first blade to selectively expose the aperture;
   a pair of second blades, each pivotably disposed on the spacer base and having a recessed structure,
      wherein the driving member of the other magnet array member engages the recessed structure of each second blade for driving the two second blades to selectively expose the aperture of the base; and
   a spacer disposed between the first blade and the second blade.

2. The shutter of a camera module as claimed in claim 1, wherein the N poles and the S poles of the disc body of the magnet array member of each electromagnetic valve are alternately and annularly arranged on the disc body.

* * * * *